United States Patent [19]

Reeves

[11] Patent Number: 4,712,815
[45] Date of Patent: Dec. 15, 1987

[54] METAL-TO-METAL WEDGE THREAD COUPLING CONNECTOR

[75] Inventor: Doyle E. Reeves, Houston, Tex.

[73] Assignee: Hydril Company, Houston, Tex.

[21] Appl. No.: 657,078

[22] Filed: Oct. 2, 1984

[51] Int. Cl.[4] .............................................. F16L 15/04
[52] U.S. Cl. ....................... 285/334; 285/379; 285/355
[58] Field of Search ............ 285/333, 334, 350, 370, 285/383, 379, 380, 332.2, 334.3, 355

[56] References Cited

U.S. PATENT DOCUMENTS

| Re. 30,647 | 1/1981 | Blose | 285/332.2 |
|---|---|---|---|
| 304,276 | 8/1884 | Nuttall | 285/355 |
| 701,019 | 5/1902 | Diescher | 285/355 |
| 1,568,993 | 1/1926 | Newsom | 285/383 |
| 1,859,311 | 5/1932 | McEvoy, Jr. | 285/333 |
| 2,150,221 | 3/1939 | Hinderliter | 285/350 |
| 2,179,202 | 11/1939 | Simpson | 285/355 |
| 2,478,818 | 8/1949 | Geiger et al. | 285/328 |
| 2,772,102 | 11/1956 | Webb | 285/334 |
| 3,158,390 | 11/1964 | Woodling | 285/334 |
| 3,339,945 | 9/1967 | McCrory, Jr. et al. | 285/355 |
| 3,427,050 | 2/1969 | Krieg | 285/355 |
| 3,508,771 | 4/1970 | Duret | 285/334 |
| 3,572,777 | 3/1971 | Blose | 285/334 |
| 4,117,949 | 10/1978 | Dwinell | 285/355 |
| 4,192,533 | 3/1980 | Blose | 285/334 |
| 4,253,687 | 3/1981 | Maples | 285/355 |
| 4,319,775 | 3/1982 | Bennett | 285/383 |
| 4,384,737 | 5/1983 | Reusser | 285/334 |
| 4,509,776 | 4/1985 | Yoshida et al. | 285/383 |
| 4,568,113 | 2/1986 | Axford et al. | 285/334 |

FOREIGN PATENT DOCUMENTS

| 94509 | 11/1983 | European Pat. Off. | 285/333 |
|---|---|---|---|
| 127560 | 12/1984 | European Pat. Off. | 285/332.3 |
| 567463 | 1/1933 | Fed. Rep. of Germany | 285/355 |
| 1127712 | 8/1956 | France | |
| 446334 | 1/1950 | Italy | 283/383 |
| 1521133 | 8/1978 | United Kingdom | 285/334 |
| 2074685 | 11/1981 | United Kingdom | |

OTHER PUBLICATIONS

"World Oil's 1986 Tubing Tables, copyright 1986, p. 41, Jan. edition.
American Petroleum Institute (API), Drilling & Production Practice 1949, copyright 1950, Kelly and Hebard.

Primary Examiner—Alexander Grosz
Assistant Examiner—Eric K. Nicholson
Attorney, Agent, or Firm—Vaden, Eickenroht, Thompson & Boulware

[57] ABSTRACT

A tubular connector for adjoining two adjacent joints comprising a first pin end on a first joint, a second pin end on a second joint and a tubular coupling member with suitable threads for mating with both pin ends. Each pin end is tapered and includes wedge threads. The wedge threads achieve a metal-to-metal seal upon makeup by providing a root-and-crest bearing surface prior to makeup. As an addition, a metal-to-metal conical seal can be provided in front of the most forward thread revolution on the pin ends. Further as an addition, an elastomeric seal can be provided in a circumferential groove just forward of the conical seal for making a compound seal therewith. A corrosion barrier ring can be included in the coupling member for filling the gap between the tip ends of the two pin ends being joined.

3 Claims, 9 Drawing Figures

METAL-TO-METAL WEDGE THREAD COUPLING CONNECTOR

BACKGROUND OF THE INVENTION

1. Field of the Invention

This invention pertains to connectors for tubular goods and more particularly to such connectors employing a coupling for making the connection between two joints or lengths or pipe which are aligned for coupling pin end to pin end.

2. Description of the Prior Art

Tubular goods used in oil and gas production generally comprise production tubing and casing. The tubular goods discussed herein are particularly well suited for such an environment and conditions of such an environment will be referred. However, the inventive coupling described and claimed herein has general application to tubular goods and therefore is not limited to such a use application.

It is quite normal for joints or lengths of tubular goods to include a pin end and a box end and to be joined to adjacent joints so that a pin end of one joint fits into the box end of the adjacent joint. In such an arrangement, the connection is referred to as an "integral" connection and no auxiliary coupling member is required.

There are two ordinary ways of constructing or manufacturing the box end, both ways entailing a change in the metallurgy of the material. A first way is by an "upsetting" technique, which is achieved at high temperature and stressing above the heated yield point of the metal. A second technique is referred to as "cold forming" or "swaging" and is not performed at elevated temperature, but does involve taking the metal beyond its yield point and introducing stresses in the metal. Some of these stresses can be relieved in a subsequent heat treatment step. However, it is well-known that even after such a step there are still permanent changes in the physical properties of the metal compared to its condition before being so worked. Various terms have been given to the resultant metal condition such as being "work-hardened", being susceptible to "hydrogen embrittlement" or being subject to "sulfide stress cracking".

Further, threads can take on numerous forms. One of the more popular forms in recent years has been the so-called "dove-tail thread", as described in U.S. Pat. No. Re. 30,647, reissued June 16, 1981, and entitled "Tubular Connection", in the name of Thomas L. Blose, which is incorporated herein by reference for all purposes. Such a thread construction causes the box connecting end to be radially pulled in and the pin connecting end to be radially pulled outwardly during makeup as the gradually width increasing helical threads are made up and the flank portions of the threads come into wedge-type contact.

It should be noted that in the threads described in U.S. Pat. No. Re. 30,647 there is appreciable space between the root and crest portions of the threads when the connection is made up. This is an acceptable condition since metal-to-metal pressure seals in most connections employed in "premium" applications are not made within the threads themselves, but at conical sealing surfaces adjacent the threads or thread sets in the case of staggered thread configurations. "Premium" situations are those situations which are at the large pressure conditions that are ordinarily encountered at greater well depths.

Heretofore, there has not been a suitable connection for "non-premium" and "semi-premium" applications that have the advantages of wedge threads and which also avoid the use of a work-hardened component. A "non-premium" application may conveniently be defined for a well depth up to about 7500 feet where the pressure encountered is relatively low, i.e., less than about 5000 psi. "Semi-premium" applications are encountered for well depths between about 7500–15,000 feet for pressure less than about 10,000 psi.

Therefore, it is a feature of the present invention to provide in one preferred embodiment an improved tubular connection using wedge threads that provide a metal-to-metal seal and an auxiliary coupling with a machined bore structure that allows a pin-end-to-pin-end connection without employing a work hardened component.

It is another feature of the present invention to provide such a coupling connection where a conical metal-to-metal sealing surface is achieved in addition to the thread seal.

It is still another feature of the present invention to provide such a coupling connection where the conical sealing surface if provided with a groove and elastomeric sealing ring which achieves a compound wedge seal with the conical sealing surface.

It is yet another feature of the present invention to provide such a coupling connection including a corrosion barrier ring between the tips of the pin ends within the bore of the coupling.

SUMMARY OF THE INVENTION

The connection comprises the facing tapered pin ends of two adjoining joints of pipe or other tubular goods and a coupling member thereabout, one coupling member end accepting one joint and the other coupling member end accepting the other joint. The threads are of the wedge type of the kind where the root-and-crest of the opposing threads makeup prior to respective flank contact, hence presaging a metal-to-metal sealing within the threads themselves upon tightening.

A second metal-to-metal sealing surface can be provided with a conical sealing surface located between the tip of the pin end and the first helical thread and a corresponding mating surface within the coupling member.

Additional or compound sealing can be provided with the presence of an elastomeric sealing ring in a groove of the conical sealing surface forward of the metal-to-metal contact location.

Finally, a corrosion barrier ring can be provided between the tips of the two pin ends within the coupling bore. An elastomeric ring such as by way of example, Teflon, can be conveniently affixed within the coupling member for providing this feature upon tightening of the connection.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope as the invention may admit to other equally effective embodiments.

In the Drawings.

DESCRIPTION OF THE PREFERRED EMBODIMENTS

Figure 1:
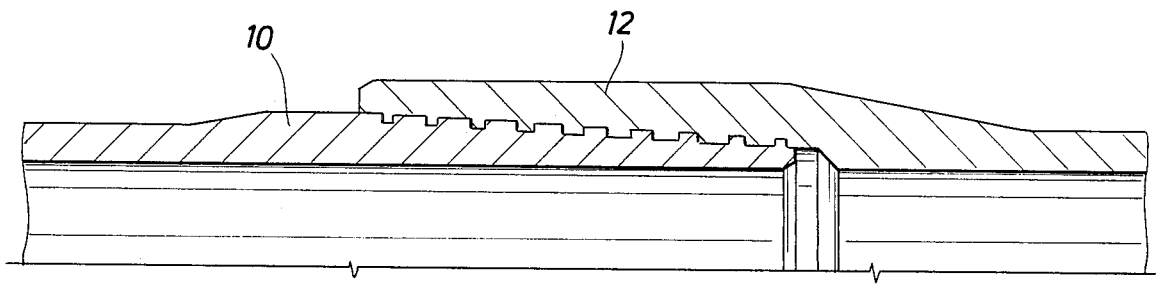
FIG. 1 is a longitudinal partial cross-sectional view of a connection of two joints having wedge threads in accordance with the prior art.

Now referring to the drawings and first to FIG. 1, a connection of a pin end 10 of one tubular member is shown connected into the box end 12 of an adjacent member, the respective ends being tapered and having wedge threads. A tapered end merely means that the ends gradually reduce in size such that the wall thicknesses of both the pin end and the box end reduce toward their tip or nose ends. A wedge thread gradually increases circumferentially from a small cross-sectional dimension or axial width near the tip end to a large one. Hence, as the threads are mated, the threads "wedge" together. This is in contrast to threads of even dimension that makeup against a stop or torque shoulder. Additionally, wedge threads also include a reverse contour on the sides or flanks of the threads that provides a "dove-tailing" action as the threads are made up. Conventional threads without such flanks place radial expansion pressure on the box end and compression pressure on the pin end as the connection is made up. By contrast, dove-tail threads radially pull the walls of the box end in a inward direction while placing a radial outward pull on the pin end. Hence, there is a balancing of the forces and a strengthening of the connection.

The simplest form of connection using wedge or dove-tail threads is shown in FIG. 1, which may be characterized as an integral connection. Only the two joined members are employed.

In making such a connection, the pin end is machined and the box end is either made by an upsetting procedure or by cold forming, with the threads then machined into the surface. Because there is no sealing mechanism or surface other than in the thread area, the threads are not exactly like the threads described in U.S. Pat. No. Re. 30,647 where only the flanks of the thread come into contact as particularly well shown in FIG. 2 of that patent. Rather, opposing thread root and thread crest come in contact before the flanks, or at least before both flanks engage, as described more fully in Patent Application Ser. Nos. 489,739 abandoned to FWC Application Ser. No. 868,887, filed Apr. 29, 1983 and 589,128 now abandoned, filed Mar. 13, 1984, in the name of the same inventor and commonly assigned herewith, which applications are incorporated herein for all purposes. In such a thread, the space at hand-tight makeup is on the flank, rather than between the root and crest, and the threads makeup in metal-to-metal bearing contact and, upon tightening, in sealing contact.

Although satisfactory in some non-premium applications, there are two shortcomings of the connection shown in FIG. 1. First, one of the structures, namely the box end, is made in such a way that its metallurgy is changed, a disadvantage and weakness in many other applications. Further, in order to provide sufficient wall thickness, particularly in the box end, there is not sufficient thickness prior to machine thread cutting to also provide a conical metal sealing surface in the box end for mating with a comparable sealing surface in advance of the pin end threads, i.e., between the first thread revolution and the tip or nose of the pin end. Again, because of the concern over the possible weakness of the box end metal caused by cold forming or the like, it is undesirable to further weaken the wall thickness of the structure by machining off additional metal. In summary, when swaging a box end structure such as the one shown in FIG. 1, there is no room for a conical sealing surface.

Figure 2:
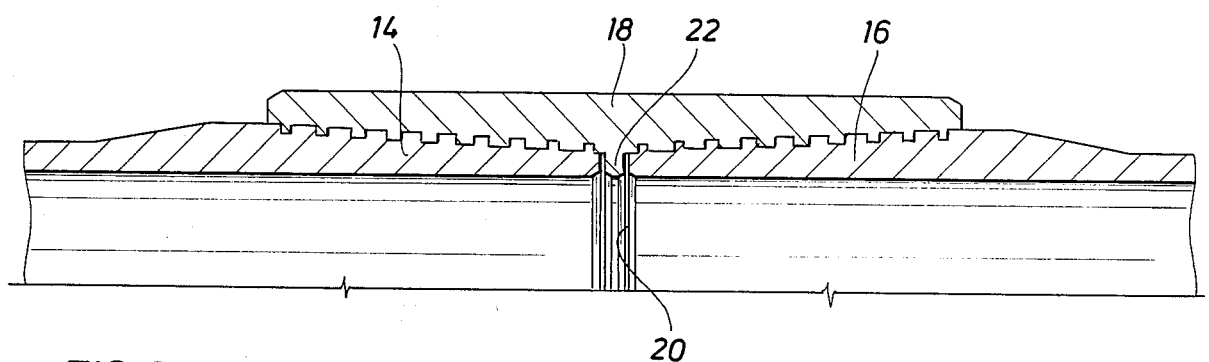
FIG. 2 is a longitudinal partial cross-sectional view of a connection utilizing a coupling with metal-to-metal thread seals in accordance with a preferred embodiment of the present invention.
Figure 3:
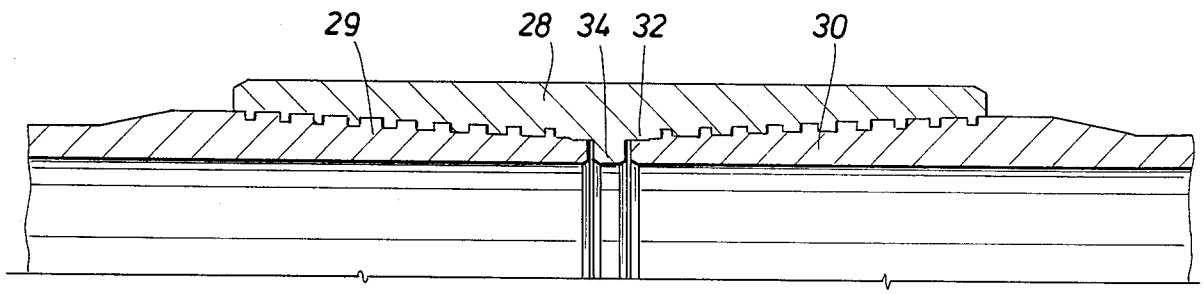
FIG. 3 is a longitudinal partial cross-sectional view of a connection having conical metal-to-metal sealing surfaces and metal-to-metal thread seals utilizing a coupling in accordance with another preferred embodiment of the present invention.
Figure 4:
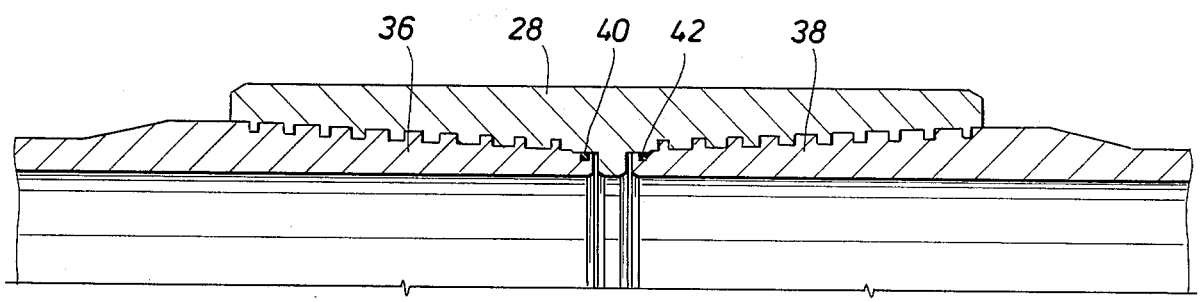
FIG. 4 is a longitudinal partial cross-sectional view of a connection having metal-to-metal sealing surfaces with an elastomeric ring and metal-to-metal threads seals utilizing a coupling in accordance with yet another preferred embodiment of the present invention.

The shortcomings of the prior art structure just discussed can be avoided with a coupling connector like that shown in FIGS. 2-4. FIG. 2 shows the coupling connection of two adjacent joints, each terminating in a pin end. Pin end 14 is joined with pin end 16 by coupling member 18. The threads of pin ends 14 and 16 are substantially identical with pin end 10 shown in FIG. 1. The threads of coupling member 18 are matingly compatible to accommodate to the thread sets of both ends 14 and 16. The internal threads of coupling member 18 are made by a machine operation, hence a cold forming or an upsetting step is avoided altogether. The coupling shown is the same in thread metal-to-metal sealing makeup as that shown and described above for FIG. 1; however, because there is no change in the metallurgy of any part, the connection is preferred by many over the connection shown in FIG. 1, especially in somewhat deeper applications where superior tensile characteristics are desired and in sour service applications (i.e. when $H_2S$ is present and tends to attack a work hardened metal).

A disadvantage is the presence of another part of the connection, namely, the coupling member, and the slight increase in outside diameter dimension. By way of example, for a nominal 2.375 inch outside diameter pipe shown in FIG. 1, the standard dimension of the outside diameter of the box end is 2.697 inches. For the same pipe shown in FIG. 2, the standard outside diameter dimension of the coupling is 3.063 inches.

It has been previously mentioned that wedge threads do not make up against a torque shoulder, but rather do make up in wedge-like contact within the threads.

Hence, there is a space 20 between the tip or nose end of the pin end and a depending portion 22 of the coupling, as shown in FIG. 2.

If there is an anticipated high flow rate of fluid through the connector, such as exists naturally with many gas wells and as exists even with oil production when there is $CO_2$-enhanced production, there is a possibility of harmful turbulence that might even reach the threads. High flow rate in the presence of a critical service application is particularly harmful. Hence, a corrosion barrier ring 24 may be employed, such as shown in FIG. 2A.

Figure 2A:
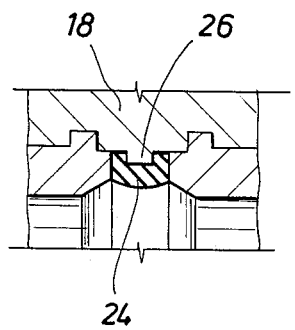
FIG. 2A is a partial cross-section of a corrosion barrier ring option that can be employed with the embodiment shown in FIG. 2.

The embodiment of FIG. 2A is identical to that of FIG. 2, except depending portion 22 is machined down to make a small projection 26 while permitting a ring 24, with a suitable mating groove for receiving portion 22, to be placed in the resulting gap or void between the tip ends or nose ends of the two adjoining pin ends. Preferably, barrier ring 24 is made of an elastomeric material. Such a ring is useful for preventing high flow rate fluids, even of highly sour constituency, from reaching and damaging the threads.

FIG. 3 illustrates a coupling connection similar to that shown in FIG. 2, but with one important addition. The respective pin ends there shown each have a conical metal sealing surfaces 50 and 51 between the first thread revolution and the tip or nose end. Coupling 28 has a suitable mating sealing surfaces 52 and 53 for creating a metal-to-metal seal with the pin ends in both the thread makeup, as has been previously described, as well as on these conical sealing surfaces. Hence, the additional sealing surface allows use of such coupling connector even in semi-premium applications.

Figure 3A:
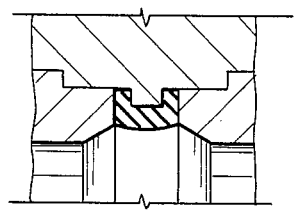
FIG. 3A is a partial cross-section of a corrosion barrier ring option that can be employed with the embodiment shown in FIG. 3.

Again, as with FIGS. 2 and 2A, FIG. 3A illustrates a corrosion barrier option or addition to the structure shown in FIG. 3.

Figure 4A:
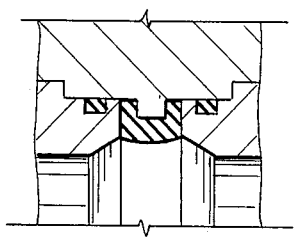
FIG. 4A is a partial cross-section of a corrosion barrier ring option that can be employed with the embodiment shown in FIG. 4.
Figure 4B:
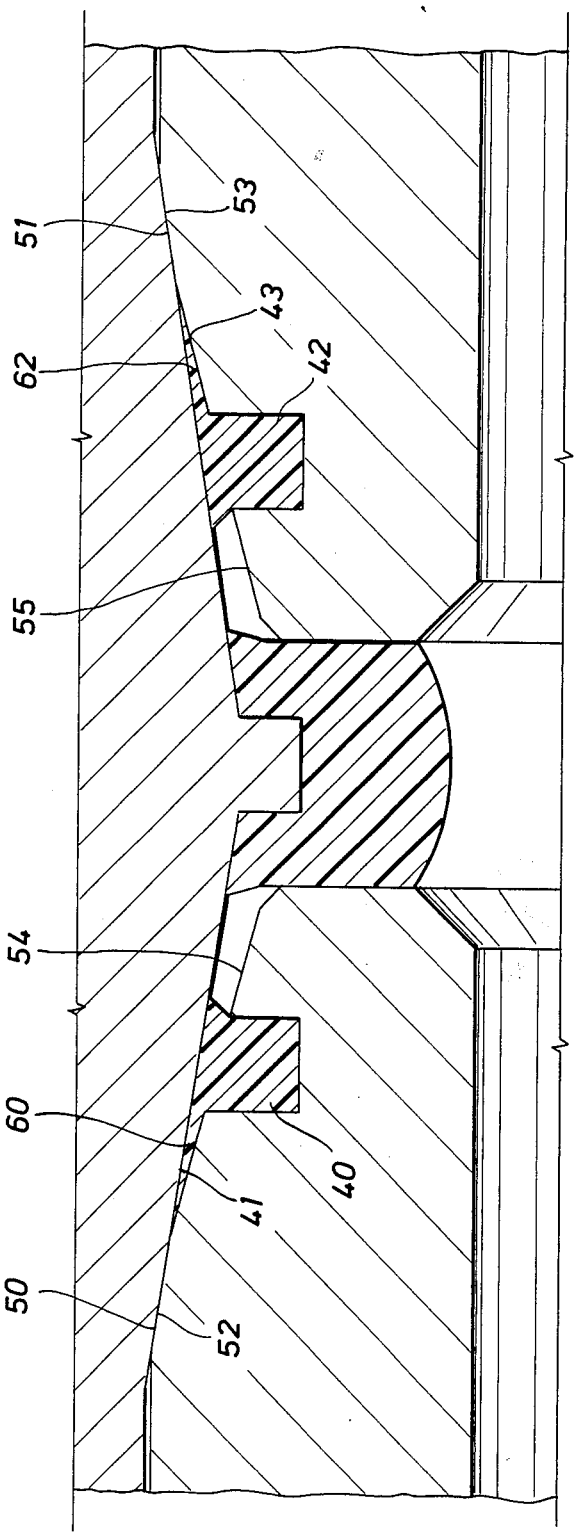
FIG. 4B is an enlarged view of the view shown in FIG. 4A.

Finally, reference is made to FIGS. 4, 4A and 4B. The embodiment of the connector illustrated in FIG. 4 is substantially identical to the embodiment of FIG. 3, except the adjacent pin ends 36 and 38 each have conical surfaces 54 and 55 between the end of each pin and conical sealing surfaces 52 and 53 that diverge from the inner surface of the coupling. Each diverging conical surface has a circumferential groove forward of the conical sealing surface for accepting a compressible elastomeric sealing ring 40 and 42, respectively, FIGS. 4A and 4B illustrate a connector that is substantially identical to the connector shown in FIG. 4, except this connector includes, in addition, a corrosion barrier ring.

Such sealing rings 40 and 42 are preferably made of an elastomeric material and extend from their respective grooves sufficiently for the rings to be compressed between the pin and the coupling when the connection is made up so that internal pressure will tend to force the sealing rings into narrowing cavities 60 and 62 between the diverging conical surfaces and the coupling in the direction of the metal-to-metal seal. A more thorough description of such a compound seal is set forth in Patent Application Ser. No. 605,378, filed Apr. 30, 1984 in the name of L. Steven Landriault, et al., which application is adopted herein by reference for all purposes.

In any event, a coupling connector with such enhanced features allows the connector to be used in semi-premium applications. As mentioned, a corrosion barrier ring can also be included, such as shown in FIGS. 4A and 4B, in the same manner as for the other corrosion barrier options, if desired.

Figure 5:
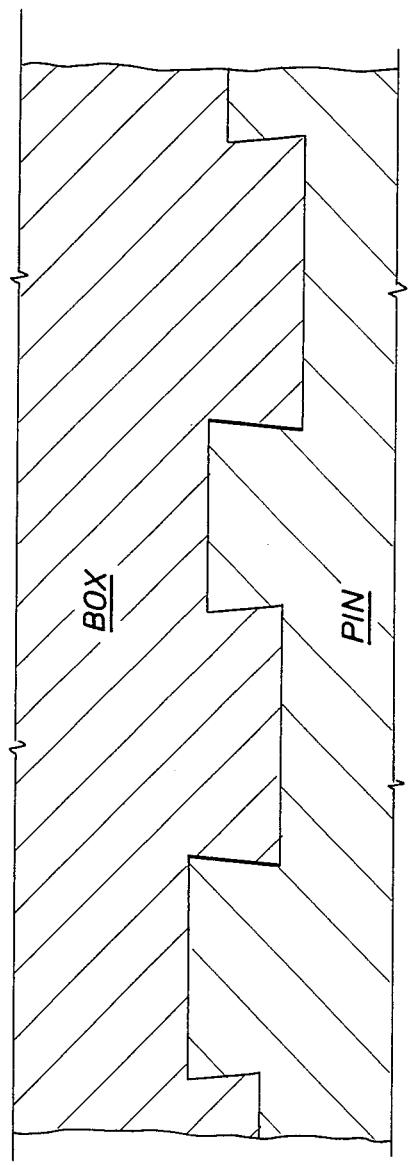
FIG. 5 is a partial cross-section on an enlarged scale of the threads of this connection.

FIG. 5 is a partial cross-section on an enlarged scale of the threads of this invention showing the dovetail shape of the threads.

While particular embodiments of the invention have been shown, it will be understood that the invention is not limited thereto. Many modifications may be made and will become apparent to those skilled in the art.

What is claimed is:

1. In a threaded connection comprising a short tubular coupling having two sets of internal threads that taper inwardly from opposite ends of the coupling toward the center to mate with external threads on pin ends of two axially aligned pipes, said threads of the coupling and the pin ends being dovetailed shaped in cross-section with the axial width of the internal threads of the coupling increasing in one direction and the axial width of the external threads on the pin ends increasing in the opposite direction so that thread flanks of both external and internal threads will engage as elongated wedges to form metal-to-metal seals when the connection is made up fully, said threads further having roots and crests that are parallel to a longitudinal axis of the coupling that engage before the flanks engage when the connection is made up hand tight and that also form metal-to-metal seals when the connection is fully made up, the improvement comprising an internal projection integral with the coupling and located between the two sets of threads and a resilient corrosion barrier ring having an external groove to receive the projection and hold the ring on the projection and which is compressed between tip ends of the pin ends of the pipes when the connection is made up fully to protect the metal-to-metal seals from corrosive fluids in the pipes.

2. The threaded connection of claim 1 in which the coupling is provided with conical sealing surfaces on opposite sides of the internal projection between the projection and the threads and each pin end has a conical sealing surface between the tip end of the pin end and the threads to engage one of the conical sealing surfaces on the coupling and form a metal-to-metal seal between the pin end and the coupling.

3. The threaded connection of claim 2 in which each pin end has a conical surface between the conical sealing surface and the tip end of the pin end that diverges inwardly from the coupling, said diverging surface having an external annular groove in the diverging conical surface, and a compressible resilient sealing ring in the groove and extending outwardly therefrom prior to make up such that during make up the sealing ring will be compressed between the pin end and the coupling so that internal pressure will tend to force the sealing ring into a narrowing cavity between the diverging conical surface and the coupling in the direction of the metal-to-metal seal.

* * * * *